United States Patent [19]
Nakashima

[11] 3,729,932
[45] May 1, 1973

[54] TANDEM MASTER CYLINDER

[75] Inventor: Katsushi Nakashima, Kariya-shi, Aichi-ken, Japan

[73] Assignee: Aisin Seiki Company Limited, Kariya-shi, Aichi-ken, Japan

[22] Filed: July 16, 1971

[21] Appl. No.: 163,441

Related U.S. Application Data

[63] Continuation of Ser. No. 835,635, June 23, 1969, abandoned.

[52] U.S. Cl. ............................. 60/54.6 E, 60/54.5 E
[51] Int. Cl. ........................................... F15b 7/00
[58] Field of Search ............... 60/54.5 A, 54.5 E, 60/54.6 A, 54.6 E

[56] References Cited

UNITED STATES PATENTS

| 3,486,337 | 12/1969 | Tenniswood | 60/54.6 E |
| 2,060,854 | 11/1936 | Carroll | 60/54.6 E |

FOREIGN PATENTS OR APPLICATIONS

| 1,379,704 | 10/1964 | France | 60/54.6 E |
| 894,651 | 7/1949 | Germany | 60/54.6 E |

Primary Examiner—Martin P. Schwadron
Assistant Examiner—A. M. Zupcic
Attorney—Sughrue, Rothwell, Mion, Zinn & Macpeak

[57] ABSTRACT

A tandem type hydraulic master cylinder is provided with a working piston and is adapted for establishing two hydraulic pressure chambers hydraulically connected with two respective hydraulic brake systems, said chambers being hydraulically connected with respective oil reservoirs. Automatic valve means are provided in communication passages between each of said chambers and reservoirs. A balance pressure cylinder is further provided as being connected hydraulically with said both hydraulic pressure chambers for pressure balancing service between said both chambers.

2 Claims, 7 Drawing Figures

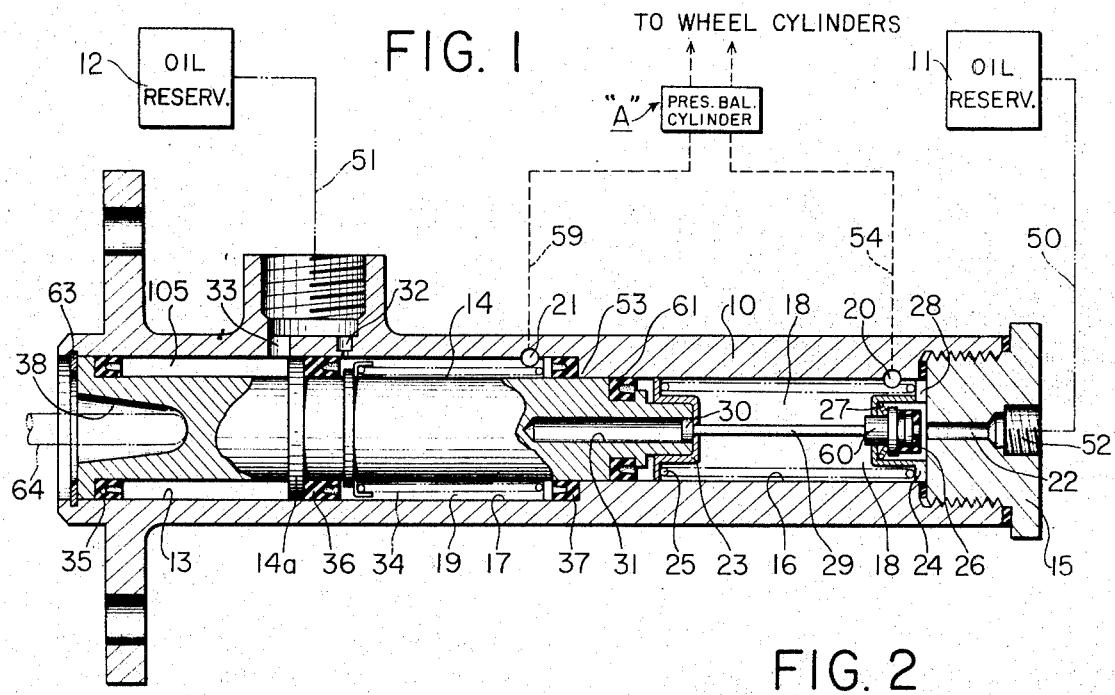
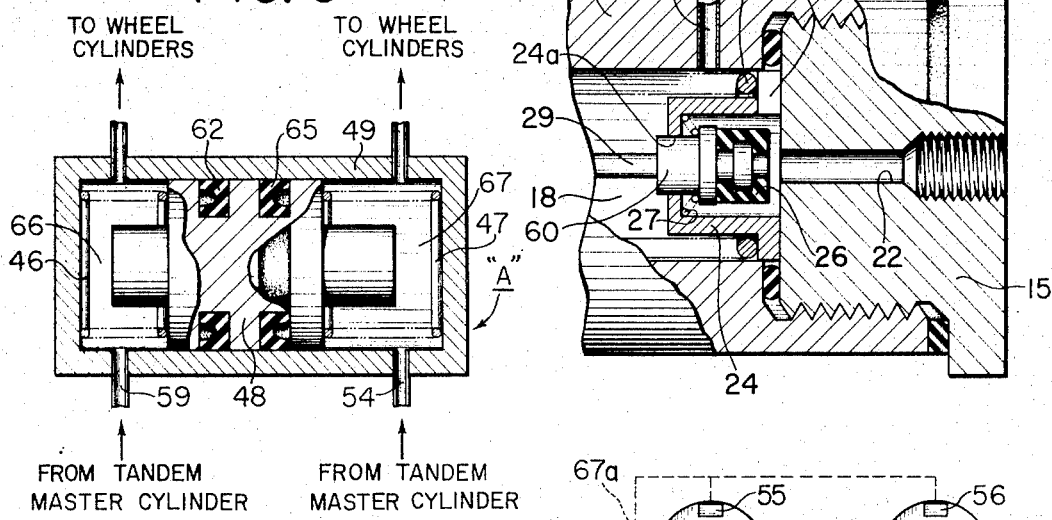
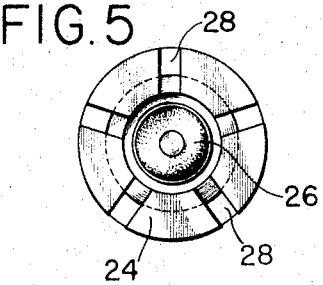
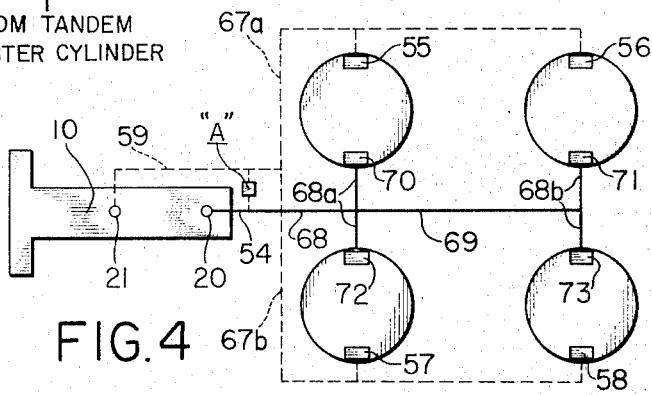

TANDEM MASTER CYLINDER

This application is a continuation of Ser. No. 835,635, filed June 23, 1969, now abandoned.

This invention relates to improvements in and relating to a tandem master cylinder equipment adapted for use in the hydraulic brake system for a powered vehicle, especially for an automotive vehicle.

Such tandem master cylinder equipment which is provided with a single working piston designed and arranged to generate the working hydraulic pressures for wheel braking in two separate and independent hydraulic chambers, said pressures being conveyed respectively to two separate hydraulic brake systems on one and the same powered vehicle.

In the case of the tandem master cylinder equipment of the above kind, if one of the independent hydraulic brake systems should fail to operate by virtue of a substantial leakage of the braking hydraulic liquid caused, for instance, by a burst in the hydraulic system, the vehicle driver must exert a substantially longer actuating stroke upon the conventional foot-operated brake pedal than that usually exercised when both independent hydraulic brake systems are effective to function properly. Such a longer idle stroke of the brake pedal, if it be performed by the vehicle driver, will lead to a considerable lack of safe braking operation.

It is therefore the main object of the present invention to provide a hydraulic master cylinder equipment adapted for avoiding said longer brake pedal stroke even when one of the independent hydraulic brake systems should be subjected to a considerable fluid leakage from the hydraulic brake system which may lead not only to a loss of safe braking function, but also to possible damage of sealing means for the hydraulic working piston.

It is a further object of the invention to provide a master cylinder equipment of the above kind, while simplifying oil replenishing means from oil reservoir means to the cylinder for said hydraulic working piston.

A still further object of the invention is to provide a hydraulic master cylinder equipment of the above kind which is reliable in its operating function and easy and economical to manufacture.

These and further objects, features and advantages of the present invention will become more apparent as the description proceeds by reference to the accompanying drawings which constitute a part of the present specification and illustrate substantially a preferred embodiment of the invention.

In the drawings:

FIG. 1 is a substantially axial sectional view of the hydraulic master cylinder, together with its several related parts which are shown in a highly simplified schematic way.

FIG. 2 is an enlarged detail sectional view of a part of the master cylinder shown in FIG. 1.

FIG. 3 is an axial sectional view of a pressure balancing cylinder assembly shown simply in a rectangular block at A in FIG. 1.

FIG. 4 is an explanatory schematic view of two automotive hydraulic wheel brake systems workable in parallel to and independently of each other, showing the mutual circuitous relationship between master cylinder, pressure balance cylinder and wheel brake cylinders.

FIG. 5 is a front view of a valve and its guiding member which are shown in FIGS. 1 and 2.

Figure 6:
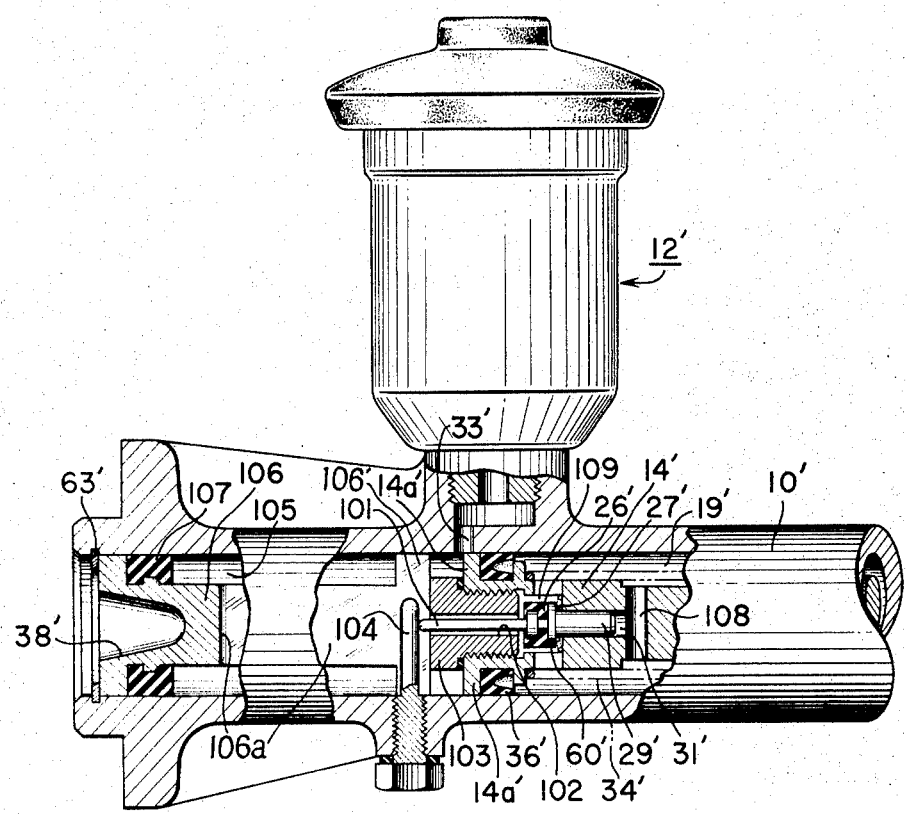
FIG. 6 is a partly sectioned side view of a modification from the embodiment of the tandem master cylinder arrangement shown in the foregoing.

Referring now to accompanying drawings, a preferred embodiment of the invention will be described in detail.

In FIG. 1, the numeral 10 denotes a hydraulic master cylinder proper which is connected hydraulically with conventional oil reservoirs 11 and 12, located above said master cylinder 10, through respective connection pipings 50 and 51, as only schematically shown. The cylinder proper 10 is provided concentrically with a concentric and stepped axial bore 13. A stepped hydraulic piston 14 is slidably and sealingly mounted in the bore 13 which is plugged sealingly at its right-hand end by a male threaded closure member 15, the latter being formed axially and centrally with a passage bore 22 and a female threaded inlet opening 52 kept in direct communication therewith. This inlet opening 52 is connected with the inner end of said connecting piping 50.

A first hydraulic pressure chamber 18 of variable volume is formed between the right-hand end of the hydraulic piston 14 and the inner end of said closure member 15. The piston 14 is formed with a large piston part 14a and the stepped cylinder bore 13 is formed with a shoulder 53, a second hydraulic pressure chamber 19 of variable volume being formed therebetween. The first hydraulic chamber is formed with a port 20, only schematically shown in FIG. 1, yet being shown more specifically in FIG. 2. This port 20 is hydraulically connected through a connecting piping 54, shown only in a simplified manner by a dotted line, to a pressure balancing cylinder assembly shown in FIG. 1 only by a rectangular block A and more specifically in FIG. 3, said cylinder assembly being further hydraulically connected with conventional automotive wheel brake cylinders 55–58, as schematically drawn in FIG. 4. Second hydraulic chamber 19 is also provided with a port 21 which is hydraulically connected through a connecting piping 59, again only schematically shown, to said pressure balance assembly A.

As shown, the passage 22 opens to the first hydraulic chamber 18. The right-hand end of hydraulic piston 14 is formed into a reduced end which receives a cup-shaped retainer 23.

A valve-guide member 24 is formed into a flanged cup so as to normally enclose the inner opening end of the passage bore 22. A return spring 25 is kept in precompressed state between the retainer and the valve-guide member. An on-off control valve 26 adapted for cooperation with the inner opening end of said passage bore 22 is fixedly mounted on a carrier member 60 which passes slidably through a guide opening 24a formed in the valve-guide member 24, said carrier being formed integral with an axially extending bar 29 which, together with the carrier 60, is urged resiliently rightwards by a spiral spring 27 provided between the valve-guide member and the valve carrier. The hydraulic piston is sealed off by several sealing means as at 35, 36, 37 and 61.

The left-hand end of the piston 14 is normally kept in pressure engagement with a retainer ring 63 provided at the left-hand end of the cylinder proper 10 and formed with a deep axial recess 38 which is kept in pressure contact with the inner end of a pusher rod 64 only schematically shown by chain-dotted lines, the latter rod being mechanically connected with a conventional foot-operated brake pedal, not shown, while the right-hand end of the hydraulic piston 14 is formed with an axial blind bore 31 which receives slidably the left-hand enlarged end at 30 of said rod 29.

As most clearly seen from FIG. 5, the valve-guide member 24 is formed with a plurality of radial grooves 28 which serves as oil passage means for hydraulically connecting said passage bore 22 with first hydraulic chamber 18. Rod 29 passes slidably through said retainer 23 and said enlarged end 30 is checked thereby against slipping out of said blind bore 31. The numeral 32 denotes a hydraulic safety passage formed in the larger bore part 17 of the cylinder proper 10. An oil replenishment port 33 is further provided through the wall of the larger bore part 17 of the hydraulic cylinder 10.

Pressure balance cylinder shown by the block A in FIG. 1 is shown more specifically in FIG. 3 wherein hydraulic cylinder 49 is shown in a simplified way, a hydraulic piston 48 being slidably mounted within the interior space of the cylinder. This piston is positioned at a balanced position as shown, under the influence of a pair of oppositely arranged balancing springs 46 and 47, as well as by the hydraulic pressures prevailing in both piston chambers 66 and 67 housing said balancing springs and acting upon the piston 48 from its both ends. For interrupting fluid communication between the piston chambers 66 and 67, the piston carries sealing means 62 and 65. As may be clearly supposed from the foregoing and from consultation with FIG. 3, the left-hand piston chamber 66 is kept in hydraulic communication through piping 59 with the second hydraulic pressure chamber 19. In the similar way, the right-hand piston chamber 67 is hydraulically connected with the first hydraulic pressure chamber 18. In addition, both piston chambers 66 and 67 are hydraulically connected with respective wheel cylinder series, as was already referred to with reference to FIG. 4.

The operation of the tandem type hydraulic master cylinder arrangement so far shown and described is as follows.

When the vehicle driver depresses the foot-brake pedal so as to move the push rod 64 in the right-hand direction in FIG. 1, the hydraulic piston 14 is also moved rightwards against the action of springs 25 and 34, thereby the hitherto established hydraulic communication between reservoir 12 through piping 51 and safety passage 32 with second hydraulic chamber 19 being interrupted and the hydraulic pressure prevailing therein being suddenly increased. This increased hydraulic pressure will then be conveyed from the chamber 19 through port 21, piping 59, left-hand hydraulic chamber 66 of pressure balance cylinder assembly A, thence through brake pipings 67a and 67b towards wheel brake cylinders 55–57.

With the right-handward movement of piston 14, the retainer 23 carried thereby will perform the same amount of axial movement of the hydraulic piston, thus the pressure contact between the retainer and the enlarged rod end 30 is released and thus the oil replenishing valve 26 will be brought into port-closing position for passage bore 22 in the closure member 15 under the influence of actuating spring 27. Therefore, the hitherto established hydraulic communication between passage bore 22 and first hydraulic chamber 18 will be interrupted, thus the hydraulic pressure prevailing in the latter chamber being increased suddenly by the inwardly advancing hydraulic piston. This increased hydraulic pressure will then be conveyed from the corresponding port 20 through piping 54, right-hand chamber 67 of the pressure balance cylinder assembly A, pipings 68, 68a, 69 and 68b, FIG. 4, to a second series of hydraulic wheel brake cylinders denoted respectively by 70–73.

These pressure oil deliveries from the tandem master cylinder to the two separate series of hydraulic brake wheel cylinders 55–58 and 70–73 are brought about by the single movement of one and the same hydraulic cylinder and thus simultaneously with each other in a rapid, smooth and positive manner.

When the vehicle driver release his foot pressure from the once actuated brake pedal, then the hydraulic piston is returned from its brake actuating position to its original starting position under the returning action of the springs 25 and 34 in a rapid manner, and the retainer 23 will follow after the piston return movement while keeping its engaging relation with the reduced piston head 23, thus the oil replenishing valve 26 being returned to a position where it is brought into pressure contact with the valve-guide member 24 against the action of spring 27 and the oil passage bore 22 being again brought into its communicating position with first hydraulic chamber 18 which is thus brought into fluid communication with oil reservoir 11.

Even when the first hydraulic brake system kept in hydraulic communication with the first hydraulic chamber should become inoperative as the result of an accident such as a burst of the first wheel brake piping system, the hydraulic chamber is kept closed in the aforementioned way by the closure of the passage bore 22 with valve member 26, therefore otherwise possible lost stroke movement of the hydraulic piston 14 being reduced to a minimum. In this case, it should be further noted that the valve member 26 has been so designed and arranged that it is not liable to damage by sliding contact with a hydraulically communication port as at 20. Therefore, the durable life of sealing means for sealing off the hydraulic piston can be extended to a rather optimum value.

When the second hydraulically brake piping system kept in cooperation with the second hydraulic chamber 19 should be subjected to a considerable fluid leakage as in the manner exemplarly described hereinabove, the hydraulic pressure in the second hydraulic chamber may be liable to be lost by the rupture of the related piping.

The modified arrangement shown in FIG. 6 can obviate this kind of drawback. For this purpose, the hydraulic piston 14' which is biased to left by spring 34' is fitted with a similar axial valve 26' which is carried by a valve carrier 60' having an axially extending stem 29'. This valve stem 29' is slidably received in an axial passage bore 31' formed in the hydraulic piston. A spring 27' biases valve 26' toward the left as viewed in FIG. 6. In this case, the carrier 60' is further formed integrally with an axially extending rod 101 which passes with ample play through an axial bore 102 formed through threaded plug piece 103 kept in thread engagement with the left-hand end of said hydraulic piston. This rod 101 acts as a motion-receiving member which is adapted for cooperation with an actuating stationary pin 104 extending inwardly and traversely of the cylinder wall 10' from outside thereof and therethrough.

A separate piston 106 is provided with sealing means 107 and formed with forked parts 106a having larger diameter parts 106'. A retainer ring 63' limits movement to the left and a recess 38' is provided to receive the push rod. A second hydraulic chamber 105 is provided within the cylinder proper 10' and between second hydraulic piston 106 and main hydraulic piston 14' and said stationary pin 104 acting as a valve stopper lies between the two forked parts 106a and within this second hydraulic chamber 105. Axial passage bore 31' is kept in second hydraulic chamber 105 through a lateral passage 108, bored through main hydraulic piston 14', with first hydraulic chamber 19'.

When the valve 26' is opened as shown, second hydraulic chamber 105 is kept in hydraulic communication through axial bore passage 102 and valve chamber 109 with first hydraulic chamber 19'. In the position shown, the interior space, not shown, of oil reservoir 12' is kept in fluid communication through oil replenishment port 33' with second hydraulic chamber 105. A similar construction is seen also in the main embodiment shown in FIG. 1. Therefore, the similar third hydraulic chamber is shown therein by the same reference numeral 105. Other construction and function of the working parts are similar to those which have been shown and described hereinbefore with reference to FIGS. 1-5, same corresponding numerals are shown also in FIG. 6 for better easy and quicker comparison, yet attached each with a prime for proper identification.

It will be easily seen that with right-handward advancement of auxiliary piston 106, the large diameter parts 106' will be displaced with the plug piece 103 and thus the main piston 14' will be advanced, the valve-actuating pin 101 being disengaged from contact with stationary pin 104. In this way, the passage bore 102 is closed by the valve 26' which is biased into the closed position by spring 27'. With this modification, even when lost pressure should occur within the first hydraulic chamber 19' caused by a bursting of the related piping, foot-pedal stroke will not be increased due to the unitary construction of piston 14' and the pressure balancing cylinder arrangement, , and thus a safety brake actuation will be assured. Furthermore, the closure of sealing means 36' will prevent the excessive loss of fluid by closing the passage between chamber 105 and chamber 19'. Although provision of sealing means 36' is made, it is reasonably protected against damage by contact with the related port 33', thanks to the provision of poppet type valve 26'-60'-29', as well as by the enlarged piston 14a'.

Figure 7:
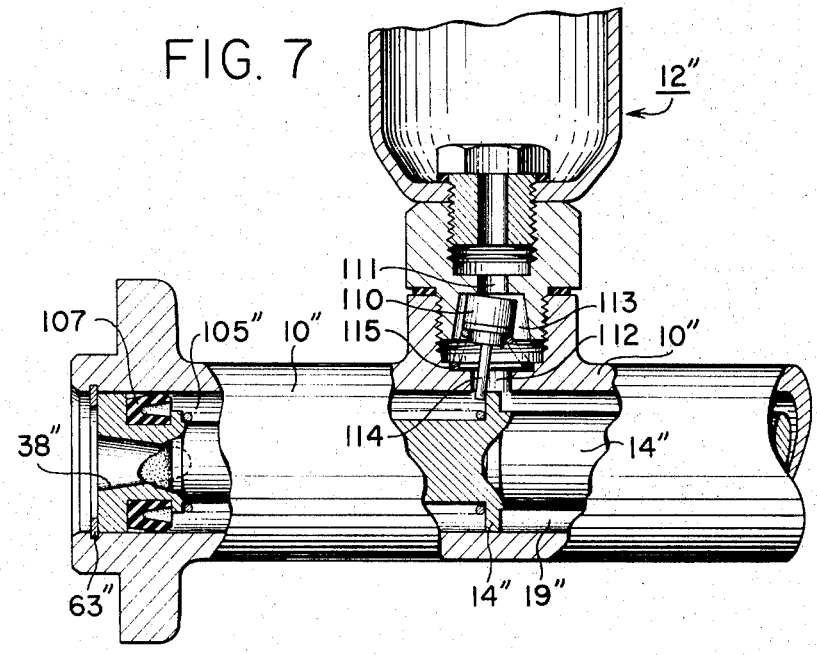
FIG. 7 is a similar view to FIG. 6, showing a still further modified tandem master cylinder arrangement.

In the further modified arrangement shown in FIG. 7, a poppet type valve 110 is provided in the communication passage 113 which serves for establishing fluid communication of the inside space of oil reservoir 12'' with second and third hydraulic chambers 19'' and 105''. With the piston 14'' positioned at its left-hand extreme position as shown, the poppet valve 110 is kept in its inclined position by contact of its stem 114 with the larger piston 14'', thus the interior of oil reservoir 12'' being kept in fluid communication with the second and the third fluid chamber. With rightward advancing movement of the piston 14'', the latter will be disengaged from contact with valve stem 114 and the valve 110 being brought into its upright and bore closing position under the influence of a back-up spring 115. Should the hydraulic pressure fail to keep its elevated or pressurized value in spite of the piston advancement, yet being caused by a pipe rupture or the like occasionary cause, the hydraulic pressure will not be lost thanks to the provision of said poppet valve means 110, 114 so that otherwise possible lost motion of foot brake pedal can be avoided. In addition, there is no piston sealing means which must slidably contact with fluid communication port 112 formed at the intersection of the main hydraulic cylinder bore with communication passage 113, and thus, piston sealing means have a longer durable life.

It will be understood that provision of pressure balance cylinder unit as shown at A in FIGS. 1-2 can also be made in said both modified arrangements for the same purpose, although not specifically shown.

I claim:

1. A tandem master cylinder comprising a cylinder body having a stepped axial bore therein defining smaller and larger diameter cross-sections, a single piston slidably mounted in said bore and cooperating with said cylinder body to define first and second pressure chambers, a pair of first passage means connecting each of said chambers to separate reservoirs and a pair of second passage means connecting each of said chambers to separate brake systems, first and second on-off valve means controlling each of said first passage means adjacent each of said chambers, said first valve means including a first valve member movable between an open and a closed position relative to one of said first passage means substantially parallel to the axis of said cylinder body within said first pressure chamber, a first control means normally holding said first valve member in the open position, first spring means operable to move said first valve member to the closed position movement of said piston in a compression stroke, said piston being provided with means defining a third chamber adjacent said second chamber, said third chamber always being connected to the other of said first passage means, a third passage means provided within said piston and connecting said second chamber to said third chamber, said second valve means being associated with said third passage means and including a second valve member movable between an open and a closed position relative to said third passage means substantially parallel to said third passage means, second control means normally holding said second valve member in the open position and second spring means operable to move said second valve member to the closed position upon movement of said piston in a compression stroke.

2. A tandem master cylinder as set forth in claim 1 further comprising pressure balancing cylinder means provided within said second passage means to balance the pressure between said first and second pressure chambers.

* * * * *